UNITED STATES PATENT OFFICE.

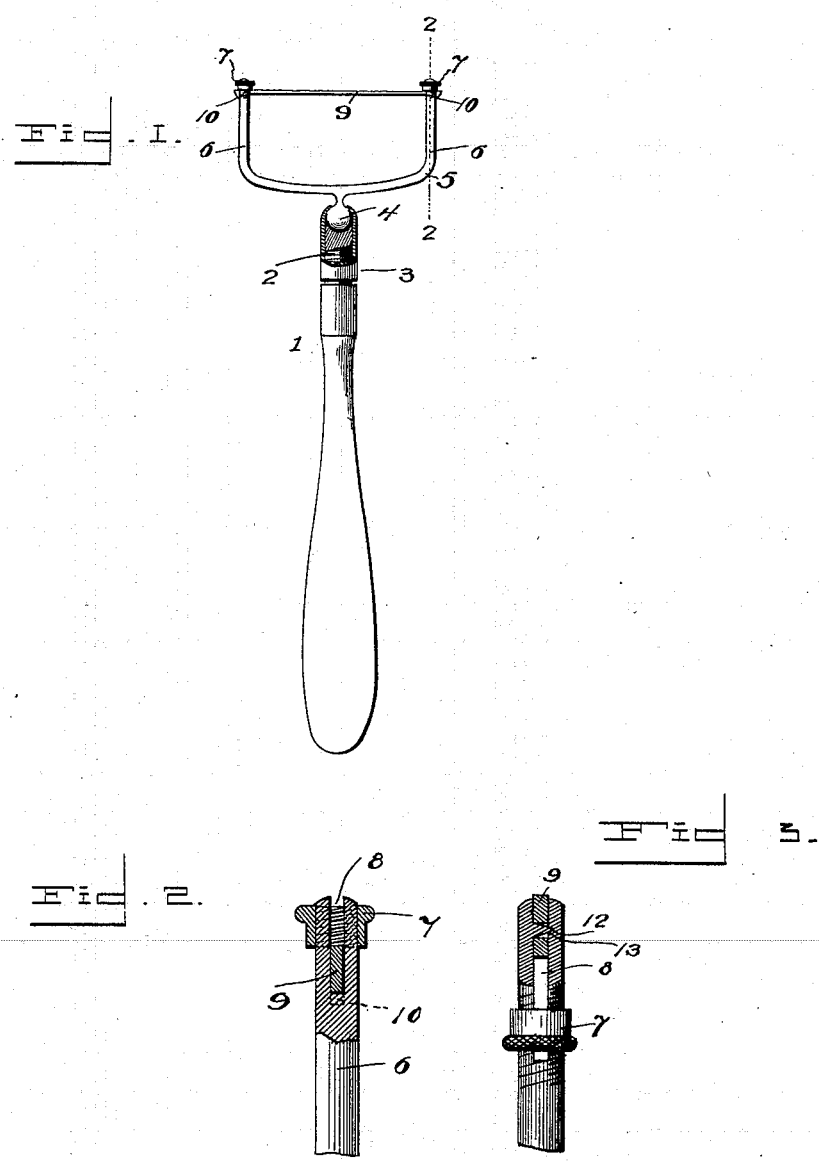

JOHN FREDERICK SNEDAKER, OF OGDEN, UTAH.

HANDPIECE AND FRAME FOR DENTAL SAWS.

SPECIFICATION forming part of Letters Patent No. 615,316, dated December 6, 1898.

Application filed August 3, 1898. Serial No. 687,608. (No model.)

*To all whom it may concern:*

Be it known that I, JOHN FREDERICK SNEDAKER, a citizen of the United States, residing at Ogden, in the county of Weber and State of Utah, have invented certain new and useful Improvements in Dental Handsaws; and I do declare the following to be a full, clear, and exact description of the invention, such as will enable others skilled in the art to which it appertains to make and use the same.

My invention relates to dental handsaws; and the object is to provide a simple, convenient, and effective device for forming spaces between the contiguous surfaces of the teeth.

To this end the invention consists in the construction, combination, and arrangement of the device, as will be hereinafter more fully described, and particularly pointed out in the claim.

The same reference characters indicate the same parts of the invention.

Figure 1 is a side elevation, partly in section, of my improved dental handsaw. Fig. 2 is an enlarged section on the line 2 2. Fig. 3 shows another form of securing the saw in the frame.

1 denotes the handle, which is formed with a cylindrical externally-threaded shank 2 to receive the adjustable internally-threaded sleeve 3. The outer end of the shank is formed with a concave socket to receive the ball 4 on the saw-frame 5, the ball being partially encompassed by the inwardly-flaring end of the sleeve. The saw-frame 5 is formed with the parallel arms 6 6, the extreme ends of which are externally threaded to receive the nuts 7 7 and also formed with alined slots 8 8 to receive the saw-blade 9, which is clamped therein by the nuts 7 7. The outer ends of the back of the saw-blade are formed with the lugs 10 10 to prevent longitudinal movement of the saw in the frame. Instead of the saw-blade a file may be secured in the frame in the same manner and for the same purpose.

In Fig. 3 I have shown the end of the saw-blade 9 formed with a transverse orifice, and one of the inner walls of the slot 8 is formed with a countersunk recess 12 to receive the alined projecting lug 13 on the opposite wall, and the nut 7 is placed below the saw, so that when the nut is moved away from the end of the frame the walls may be sprung apart, so that the lug 13 may be inserted in the orifice in the saw-blade, and when the nut is moved forward the lug will extend through the saw-blade and into the recess 12 to rigidly lock the blade or file in place.

Having thus fully described my invention, what I claim as new and useful, and desire to secure by Letters Patent of the United States, is—

The combination with the handle 1 formed with the threaded cylindrical shank 2 and the internally-threaded sleeve 3, encompassing said shank, of the frame 5, formed with the ball 4 and the integral parallel arms 6 6 having their immediate ends externally threaded and formed with the alined slots 8 8 and the nuts 7 7 removably secured on said threaded slotted ends, substantially as and for the purpose shown and described.

In testimony whereof I have hereunto set my hand in presence of two subscribing witnesses.

JOHN FREDERICK SNEDAKER.

Witnesses:
  R. H. MOYES,
  E. A. STRATFORD.